US007758150B2

(12) United States Patent
Komatsu

(10) Patent No.: US 7,758,150 B2
(45) Date of Patent: Jul. 20, 2010

(54) CAPTURE MEMBER AND INK JET PRINTER

(75) Inventor: Hidehiko Komatsu, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 30 days.

(21) Appl. No.: 11/507,931

(22) Filed: Aug. 22, 2006

(65) Prior Publication Data

US 2007/0046722 A1 Mar. 1, 2007

(30) Foreign Application Priority Data

Aug. 24, 2005 (JP) ............................. 2005-242233

(51) Int. Cl.
*B41J 2/165* (2006.01)
*G01D 11/00* (2006.01)

(52) U.S. Cl. ............................ 347/31; 347/35; 347/100

(58) Field of Classification Search ................... 347/31, 347/35, 100, 21, 28
See application file for complete search history.

(56) References Cited

U.S. PATENT DOCUMENTS 4,235,561 A * 11/1980 Peterson ...................... 405/45
4,306,498 A * 12/1981 Fujimura .................... 101/333
4,350,724 A * 9/1982 Marrs .......................... 428/69
4,460,530 A * 7/1984 Hanson et al. .............. 264/121
4,937,015 A * 6/1990 Krieg et al. ................. 252/511
5,170,556 A * 12/1992 Kamimura et al. ..... 29/888.047
5,314,405 A * 5/1994 Kriesel et al. .................. 604/8
5,804,074 A * 9/1998 Takiguchi et al. ...... 210/497.01
5,980,018 A * 11/1999 Taylor et al. .................. 347/31
6,030,558 A * 2/2000 Smith et al. ................... 264/41
6,239,817 B1 * 5/2001 Meyer ......................... 347/36
6,877,851 B2 * 4/2005 Watanabe ................... 347/100

FOREIGN PATENT DOCUMENTS

JP 11-268301 10/1999
JP 2003-39754 2/2003
JP 2003-191545 7/2003
JP 2004-1485 1/2004
JP 2004-174978 6/2004
JP 2004-209980 7/2004

OTHER PUBLICATIONS

Schlumberger: definition for "polyol", searched from "goggle" web site.*
Computer-Generated English Translation of Specification and Claims and Patent Abstracts of Japan of 2004-209980 dated Jul. 29, 2004.
Computer-Generated English Translation of Specification and Claims and Patent Abstracts of Japan of 2004-174978 dated Jun. 24, 2004.

(Continued)

*Primary Examiner*—shih-wen hsieh
(74) *Attorney, Agent, or Firm*—Ladas & Parry LLP

(57) ABSTRACT

The present invention provides a capture member for directly capturing ink droplets ejected to an area other then a recording medium, among ink droplets ejected from a printer head for ink jet recording, wherein said member comprises a porous plastic produced by sinter molding of plastic particles, and contains an impregnating agent impregnated therein.

10 Claims, 3 Drawing Sheets

OTHER PUBLICATIONS

Computer-Generated English Translation of Specification and Claims and Patent Abstracts of Japan of 2004-1485 dated Jan. 8, 2004.

Computer-Generated English Translation of Specification and Claims and Patent Abstracts of Japan of 2003-191545 dated Jul. 9, 2003.

Computer-Generated English Translation of Specification and Claims and Patent Abstracts of Japan of 2003-39754 dated Feb. 13, 2003.

Computer-Generated English Translation of Specification and Claims and Patent Abstracts of Japan of 11-268301 dated Oct. 5, 1999.

* cited by examiner

CAPTURE MEMBER AND INK JET PRINTER

FIELD OF THE INVENTION

The present invention relates to a capture member and an ink jet printer. According to the invention, for example, in marginless printing by an ink jet recording system, a capture member for capturing ink droplets ejected to an area other than a recording medium can be kept in a good state for a long period of time.

BACKGROUND OF THE INVENTION

Also in an ink jet recording system, marginless printing similar to silver salt photography has been performed. In the marginless printing, the whole surface is required to be used as an image area without leaving any non-mage area (margin) at all on an outside edge portion of a recording medium. Accordingly, ink droplets are continuously ejected from a printer head, from the surface of the recording medium to the outside of the outside edge portion, thereby being able to form a proper image up to the outside edge portion of the recording medium. The principal of the marginless printing which has hitherto been performed as described above will illustrated below with reference to the attached drawings.

First, the principal of the marginless printing is schematically shown in FIGS. 1 and 2. FIG. 1 are enlarged perspective views of a substantial part schematically showing a process of the marginless printing by the ink jet recording system. FIG. 1(A) shows a state in which a leading edge portion of the recording medium is being printed, FIG. 1(B) shows a state in which a side edge portion of the recording medium is being printed, and FIG. 1(C) shows a state in which a trailing edge portion of the recording medium is being printed. FIG. 2 is a schematic side view of the substantial part showing the state of FIG. 1(A).

As shown in FIGS. 1 and 2, an ink jet recording apparatus 10 comprises a recording head 13 mounted on a carriage 14 which reciprocates along a guide shaft 12 extending in a main scanning direction (that is to say, a widthwise direction of recording paper 11; a direction of arrow B), and a platen (not shown) disposed under this recording head 13 with facing thereto. The recording paper 11 is fed by a paper feed means (not shown) in a sub-scanning direction (a direction of arrow A in FIGS. 1 and 2) between the above-mentioned recording head 13 and the above-mentioned platen.

When a leading edge portion 11*a* of the recording paper 11 is fed under the recording head 13, printing on the leading edge portion 11*a* is initiated, as shown in FIGS. 1(A) and 2. That is to say, the recording head 13 ejects ink droplets 19 toward the direction of the recording paper 11 while reciprocating along the guide shaft 12 in the main scanning direction (the direction of arrow B), thereby initiating the printing. At this time, the printing is executed without leaving any margin on the leading edge portion 11*a* of the recording paper 11, so that the ink droplets 19 are also ejected on the outside of the leading edge portion 11*a* of the recording paper 11. The ink droplets 19 ejected on the outside of the recording paper 11 are directly deposited on a capture member 30 mounted on the platen, and further penetrate into the inside of the capture member 30 to form an ink liquid capture area 31.

When the printing on the leading edge portion 11*a* of the recording paper 11 is terminated, the recording paper 11 is fed in the sub-scanning direction (the direction of arrow A), and the printing on a central portion of the recording paper 11 is performed. In the printing on the central portion, the printing is executed without leaving any margin on a side edge portion 11*b* of the recording paper 11, so that the ink droplets 19 are also ejected on the outside of the side edge portion 11*b* of the recording paper 11, as shown in FIG. 1(B). The ink droplets 19 thus ejected on the outside are directly deposited on the capture member 30 mounted on the platen, and captured. Further, when the printing on the central portion of the recording paper 11 is terminated, the recording paper 11 is fed in the sub-scanning direction (the direction of arrow A), and the printing on a trailing edge portion 11*c* of the recording paper 11 is performed. Also in the printing on the trailing edge portion 11*c*, the printing is executed without leaving any margin on the trailing edge portion 11*c* of the recording paper 11, so that the ink droplets 19 are also ejected on the outside of the trailing edge portion 11*c* of the recording paper 11, as shown in FIG. 1(C). The ink droplets 19 are directly deposited on the capture member 30 mounted on the platen, and captured.

As shown in FIGS. 1 and 2, in order to perform the marginless printing, the ink droplets 19 are also ejected on the outside of the recording paper. In order to prevent the ink droplets 19 ejected on the outside of the recording paper 11 from staining the back side of the recording paper 11 and the like, it is necessary to mount the capture member on the platen. An ink jet recording apparatus in which such a capture member is mounted on the platen is shown in FIGS. 3 to 5.

FIG. 3 is a perspective view showing a typical ink jet recording apparatus 10A. A case cover 1 thereof is opened, and a print mechanism portion is particularly shown. In the print mechanism portion, there are disposed a carriage 4 equipped with ink cartridges 2 and 3 and a recording head 4A, and a platen 5 in a position facing to a traveling path thereof. Further, in a position across the platen 5, there are disposed a first paper pressing roller 6 upstream from a discharge direction of recording paper, and a second paper pressing roller 7 downstream therefrom. FIG. 4 is a partial plain view of the print mechanism portion of the ink jet recording apparatus 10 shown in FIG. 3, and FIG. 5 is a partial sectional view of the print mechanism portion of the ink jet recording apparatus 10 shown in FIG. 3.

In particular, platen openings 5*a*, 5*b* and 5*c* are formed in parts of the platen 5, and a capture member 20 is disposed in a lower portion of the platen 5, as shown in FIGS. 4 and 5. The platen opening 5*a* is a window for allowing the capture member 20 to directly capture ink droplets without depositing the ink droplets on a surface of the platen 5 and without generating ink mist in printing of a leading edge portion of recording paper P, and the platen openings 5*b* and 5*c* are each a window used in printing of a side edge portion and a trailing edge portion of the recording paper P. That is to say, of the ink droplets ejected from the recording head 4A, all of the ink droplets ejected outside the recording paper P are directly captured by the capture member 20 through the platen openings 5*a*, 5*b* and 5*c*. The recording paper P is fed while bringing the back side thereof in contact with a surface of the platen 5, and in that case, the capture member 20 is required to be disposed at such a height that the back side of the recording paper P does not happen to come in contact with an upper surface of the capture member 20.

The capture member 20 is carried on a support member 8, as shown in FIG. 5, and further, a support member opening 8*a* is formed in the support member 8. A waste ink tank 9 is provided under this support member, so that an ink liquid temporarily captured by the capture member 20 is gradually introduced from the support member opening 8*a* to the waste ink tank 9, and absorbed and retained by an absorbing retainer usually provided in the waste ink tank 9.

In this specification, the term "lower (under)" or "upper (above)" means lower (under) or upper (above) with respect to the gravitational direction in a state in which printing is performed by a printer.

Recently, pigment inks have been employed mainly intending to improve keeping qualities of printed matter. The capture member as described above is usually formed of a porous material (for example, a urethane foam). Accordingly, particularly in the case of the pigment ink, only a solvent component penetrates into the inside, and pigment particles tend to remain on a surface of the porous capture member to accumulate. When the accumulation of the pigment particles gradually grows up on the surface of the porous capture member to form a protrusion on the platen opening, the pigment particles are adhered to the back side of the recording paper, and further, transferred from the back side of the recording paper to the surface of the platen, resulting in staining of the back side of different recording paper.

Techniques for preventing such accumulation of the pigment particles have already been proposed. For example, a technique of impregnating the above-mentioned capture member with an organic solvent has been known (patent document 1). Further, a technique of impregnating the capture member with an organic solvent selected corresponding to the kind of color of the pigment ink has also been known (patent document 2). Furthermore, a technique of using a bilayer structure of a receiving layer and a diffusion layer, or a multilayer structure of more layers as the above-mentioned capture member has also been known (patent document 3). Moreover, a technique of forming through-holes in the above-mentioned capture member to accelerate penetration has also been known (patent document 4).

Patent Document 1: JP-A-2003-191545

Patent Document 2: JP-A-2004-174978

Patent Document 3: JP-A-2003-39754

Patent Document 4: JP-A-2004-1485

SUMMARY OF THE INVENTION

The present inventors have conducted extensive studies in materials suitable as capture materials and other than urethane foams which have hitherto been used in the capture materials. As a result, it has been found that a porous material produced by sinter molding of plastic particles is excellent particularly as a capture member of a printer using a pigment ink, and that when this capture member is impregnated with an impregnating agent, the above-mentioned accumulation of pigment particles can be effectively prevented.

The invention is based on such findings.

Accordingly, the invention relates to a capture member for directly capturing ink droplets ejected to an area other then a recording medium, among ink droplets ejected from a printer head for ink jet recording, wherein the member comprises a porous plastic produced by sinter molding of plastic particles, and contains an impregnating agent impregnated therein.

In a preferred embodiment of the capture member according to the invention, the above-mentioned plastic particles are particles of a polyolefin-based resin, a vinyl-based resin, a polyester-based resin, a polyamide-based resin, a polystyrene-based resin, an acrylic resin, a polysulfone resin, a polyethersulfone resin, a polyethylene sulfide resin, a fluororesin or a crosslinked polyolefin-based resin, or a particle mixture thereof.

In an another preferred embodiment of the capture member according to the invention, the impregnating agent particularly comprises at least a polyol having a vapor pressure at 20° C. of 0.1 mmHg or less, and/or a solid humectant having a melting point of 20° C. or more and a solubility in water at 20° C. of 5% by weight or more.

The invention also relates to an ink jet printer comprising the above-mentioned capture member.

In a preferred embodiment of the ink jet printer according to the invention, an ink used is a pigment ink.

In another preferred embodiment of the ink jet printer according to the invention, the printer comprises a printer head for color printing having such a structure that another ink droplet does not land on an ink droplet which has landed on a surface of the capture member.

As described above, the capture member of the invention comprises the porous plastic produced by sinter molding of the plastic particles, and moreover, contains the impregnating agent impregnated therein, so that the ink droplets which land on the surface thereof rapidly penetrate into the inside thereof, resulting in difficulty for an ink agglomerate to accumulate on the surface. Further, the ink droplets which have landed on the surface not only penetrate in an inside direction, but also diffuse in a horizontal direction. Accordingly, the capture member also has functions of washing the ink droplets which have adjacently landed on the surface thereof and allowing the ink droplets to penetrate in the inside direction. Furthermore, the properties of the above-mentioned inside penetration and horizontal diffusion are observed with respect to not only a dye ink but also a pigment ink. It is therefore preferred that the capture member is used particularly in a printer using the pigment ink.

Moreover, the accumulation of the pigment ink on the capture member is substantially reduced, so that the print life of the capture member is prolonged. In addition, the marginless printing can be performed without generating mist.

Figure 1:
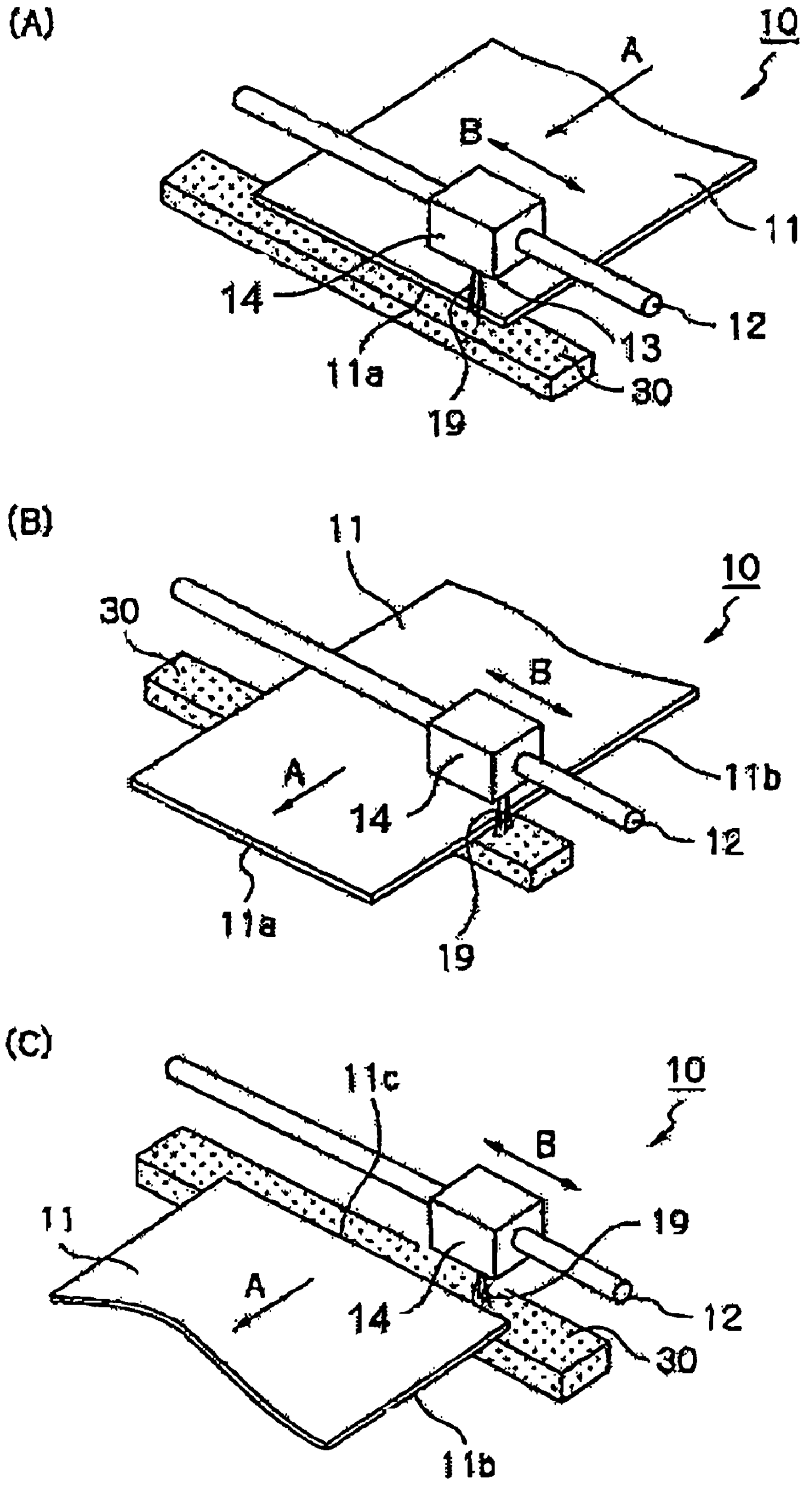
FIGS. 1(A) to 1(C) are enlarged perspective views of a substantial part schematically showing a process of marginless printing by an ink jet recording system.
Figure 2:
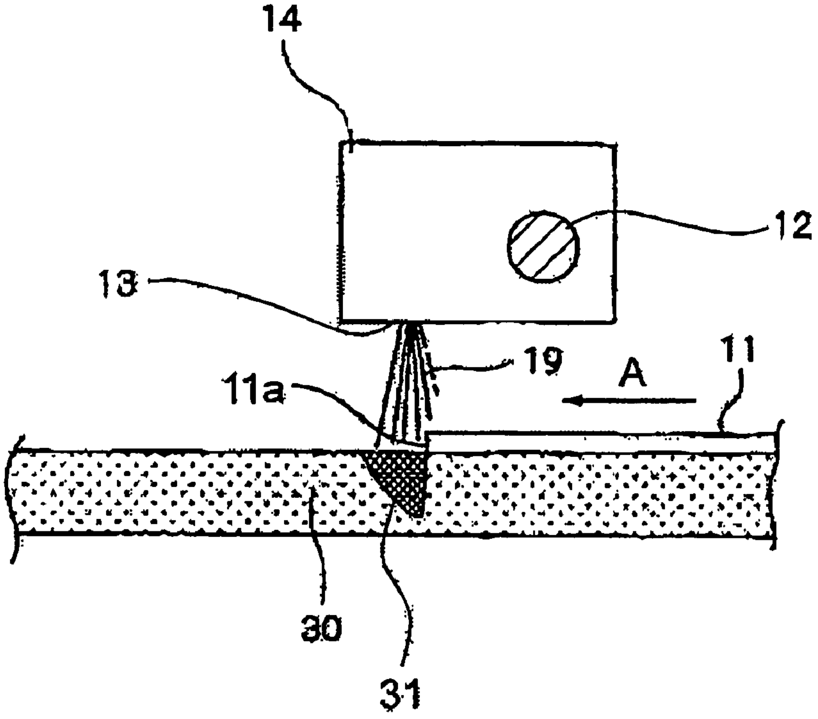
FIG. 2 is a schematic side view of the substantial part showing the state of FIG. 1(A).
Figure 3:
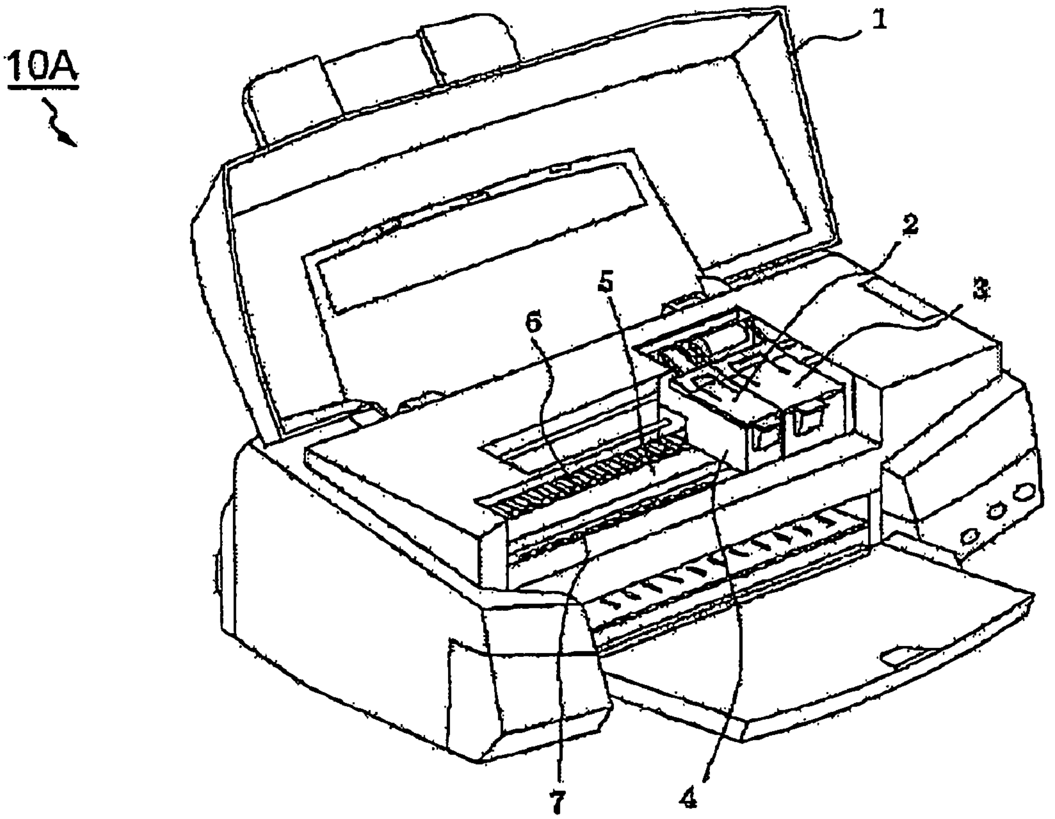
FIG. 3 is a perspective view showing a typical ink jet recording apparatus.
Figure 4:
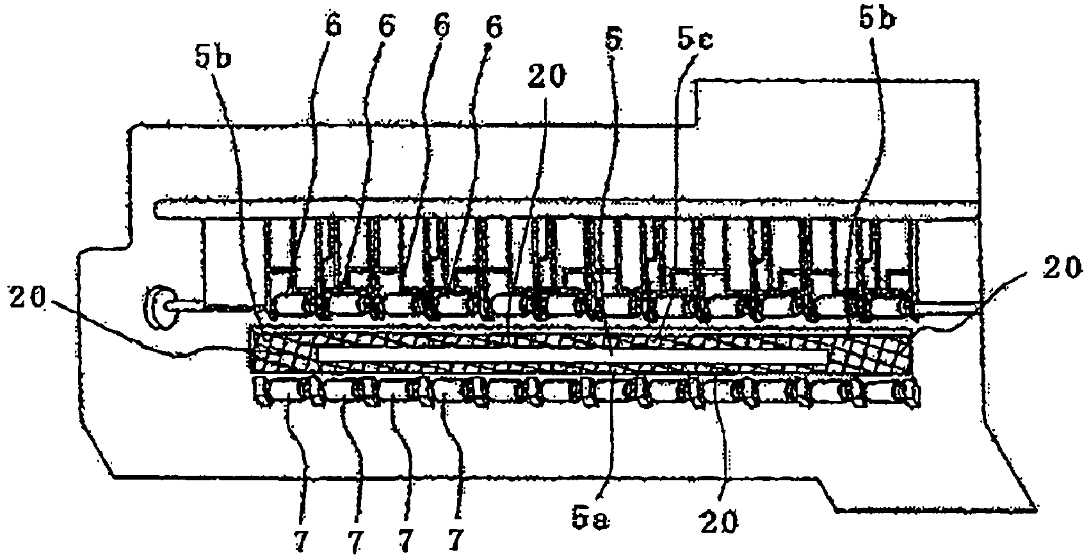
FIG. 4 is a partial plain view of a print mechanism portion of the ink jet recording apparatus shown in FIG. 3.
Figure 5:
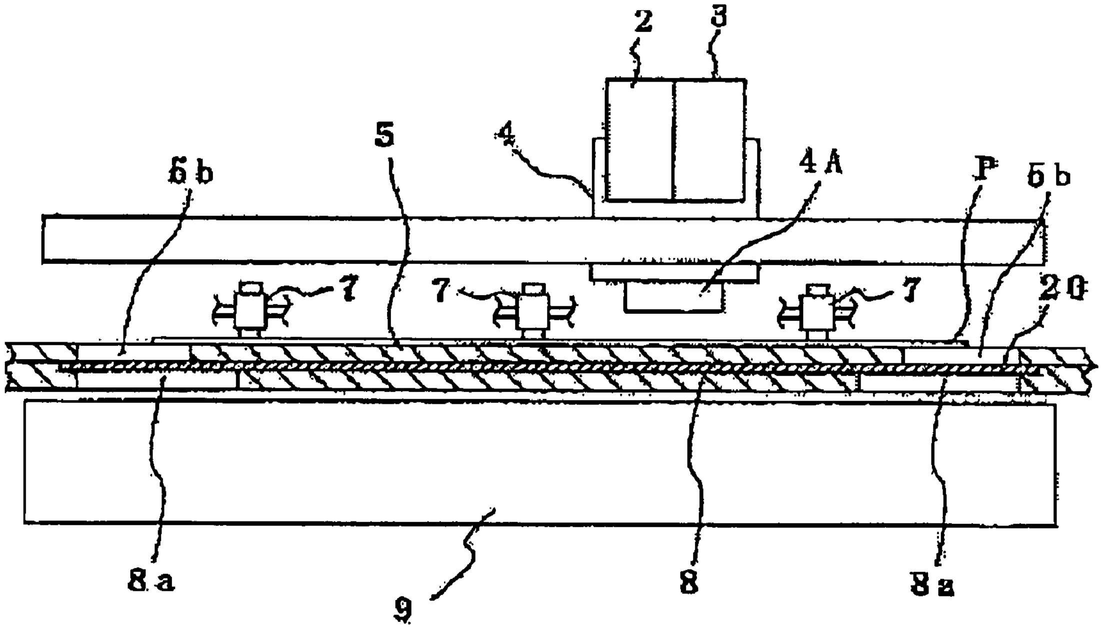
FIG. 5 is a partial sectional view of a print mechanism portion of the ink jet recording apparatus shown in FIG. 3.

The reference numerals and signs used in the drawings denote the followings, respectively.

1 . . . Case Cover

2, 3 . . . Ink Cartridges

4 . . . Carriage

4A . . . Recording Head

5 . . . Platen

5*a*, 5*b*, 5*c* . . . Platen Openings

6 . . . First Paper Pressing Roller

7 . . . Second Paper Pressing Roller

8 . . . Support Member

8*a* . . . Support Member Opening

9 . . . Waste Ink Tank

10, 10A . . . Ink Jet Recording Apparatus

11 . . . Recording Paper

11*a* . . . Leading Edge Portion of Recording Paper

11*b* . . . Side Edge Portion of Recording Paper

11*c* . . . Trailing Edge Portion of Recording Paper

12 . . . Guide Shaft

13 . . . Recording Head

14 . . . Carriage
19 . . . Ink Droplets
20 . . . Capture Member
30 . . . Capture Member
31 . . . Ink Liquid Capture Area

DETAILED DESCRIPTION OF THE INVENTION

The capture member of the invention comprises the porous plastic produced by sinter molding of the plastic particles. As the above-mentioned plastic particles, there can be used thermoplastic particles. For example, there can be used particles of a polyolefin-based resin (for example, polyethylene such as ultra-high molecular weight polyethylene or high density polyethylene, or polypropylene), a vinyl-based resin (for example, a polyvinyl chloride resin), a polyester-based resin (for example, polyarylate), a polyamide-based resin, a polystyrene-based resin, an acrylic resin, a polysulfone resin, a polyethersulfone resin, a polyethylene sulfide resin, a fluororesin or a crosslinked polyolefin-based resin, or a particle mixture thereof.

The fluororesins include, for example, polytetra-fluoroethylene, polyfluoroacryl acrylate, polyvinylidene fluoride, polyvinyl fluoride, hexafluoropropylene and the like.

The crosslinked polyolefin-based resin material is one obtained by irradiating a polyolefin-based resin, for example, polyethylene such as low density polyethylene, intermediate density polyethylene or high density polyethylene, or polypropylene, with ionizing radiation such as a γ-ray or an X-ray to crosslink it, or one obtained by chemically crosslinking the polyolefin-based resin, using an inorganic compound such as aluminum chloride or nitrogen fluoride or an organic peroxide such as t-butyl cumyl peroxide, dicumyl peroxide, 2,5-dimethyl-2,5-di(t-butylperoxy)hexane or acetylene peroxide as a crosslinking agent.

Although the average particle size of the above-mentioned plastic particles is not particularly limited, it is preferably, for example, 1,000 μm or less. Further, although the melt flow rate (MFR) is also not particularly limited, the use of the material having a melt flow rate of, for example, 0.01 or less is suitable in that the sintered porous plastic having a uniform pore size can be obtained.

The porous plastic used in the invention can be produced by sinter molding of the above-mentioned thermoplastic particles according to a static molding method or a dynamic molding method.

The above-mentioned static molding method is a so-called in-mold sintering method, and, for example, a method in which the thermoplastic particles are filled in a cavity formed in a space of a forming die, followed by heating them together with the forming die.

As the above-mentioned dynamic molding method, there is (1) a ram extrusion method using a ram extruder having a piston (plunger) built-in to reciprocate in a cylinder which has a forming die at a leading end thereof and the temperature of which is adjustable, (2) an injection molding method using an injection molding machine having a screw built-in in a cylinder which has a forming die at a leading end thereof and the temperature of which is adjustable, (3) an extrusion molding method using an extrusion molding machine having a screw built-in in a cylinder which has a forming die at a leading end thereof and the temperature of which is adjustable, (4) a compression molding method using a compression molding machine in which a forming die comprising a female die and a male die inserted in an internal diameter portion thereof is used, and a raw material is filled in a cavity formed in the inside of the female die, followed by heating the forming die, or (5) a continuous press method using a continuous pressing machine in which a raw material is extruded by a cylinder which has a forming die constituted by a pair of upper and lower traveling belts or a lower traveling belt at a leading end thereof and the temperature of which is adjustable, into this forming die.

From these static and dynamic forming methods, a suitable method can be appropriately selected depending on requirements such as the final shape and physical properties of the porous plastic used in the invention.

The molded article (molded plate) of the sintered porous plastic thus obtained looks like an ordinary plastic molded article (molded plate) in appearance, but actually, has numerous pores connected to one another in multiple directions. Further, the above-mentioned molded article of the sintered porous plastic is commercially available. The molded articles (molded plates) having various pore size are easily available (for example, Porex Porous Plastic (Porex Technologies GmbH) and Fildus (Mitsubishi Plastics, Inc.).

Antistatic properties can be imparted to the capture member of the invention. Antistatic treatment can be conducted, for example, by adding a conductive agent such as carbon black, carbon fiber, metal powder or potassium titanate the surface of which is coated with a metal to the above-mentioned thermoplastic particles, for example, in an amount of 1 to 5% by weight (preferably, 1 to 2% by weight), and subjecting the resulting mixture to sinter molding.

The capture member of the invention can carry the impregnating agent in a wet or dry state. The impregnating agents typically include a polyol having a vapor pressure at 20° C. of 0.1 mmHg or less and/or a solid humectant having a melting point of 20° C. or more and a solubility in water at 20° C. of 5% by weight or more.

The polyols having a vapor pressure at 20° C. of 0.1 mmHg or less which are used as the above-mentioned impregnating agents are preferably ones having high moisture retention or moisture absorption and hard to vaporize, and specifically include polyhydric alcohols such as glycerol, ethylene glycol, diethylene glycol, triethylene glycol, tetraethylene glycol, 1,3-propanediol, 1,3-butanediol, 1,4-butanediol, 2,3-butanediol, 1,5-pentanediol, 2-butene-1,4-diol, 1,6-hexanediol, 2-methyl-2,4-pentanediol, 2-ethyl-1,3-hexanediol, 1,2,6-hexanetriol, propylene glycol, dipropylene glycol, tripropylene glycol and polyethylene glycol.

Further, the solid humectants having a melting point of 20° C. or more and a solubility in water at 20° C. of 5% by weight or more which are used as the above-mentioned impregnating agents include alcohols, esters, nitrogen compounds and saccharides. Such a solid humectant exists as a solid at near room temperature (about 20° C.), and does not happen to be lost by evaporation. Accordingly, this is preferred because the effect thereof can be maintained over a long period of time.

Of the solid humectants, the alcohols specifically include 1,4-butanediol, 2,3-butanediol and 2-ethyl-2-(hydroxymethyl)-1,3-propanediol, and the esters include ethylene carbonate. The nitrogen compounds include acetamide, N-methylacetamide, 2-pyrrolidone, ε-caprolactam, urea, thiourea and N-ethylurea, and the saccharides include dihydroxyacetone, erythritol, D-arabinose, L-arabinose, D-xylose, 2-deoxy-β-D-ribose, D-lyxose, L-lyxose, D-ribose, D-arabitol, ribitol, D-altrose, D-allose, D-galactose, L-galactose, D-quinovose, D-glucose, D-digitalose, D-digitoxose, D-cymarose, L-sorbose, D-tagatose, D-talose, 2-deoxy-D-glucose, D-fucose, L-fucose, D-fructose, D-mannose, L-rhamnose, D-inositol, myo-inositol, D-glucitol, D-mannitol, methyl=D-galactopyranoside, methyl=D-glucopyranoside, methyl=D-mannopyranoside, N-acetylchitobiose, isomaltose, xylobiose, gentiobiose, kojibiose, chondrosine, sucrose, cellobiose, sophorose, α,α-trehalose, maltose, melibiose, lactose, laminaribiose, rutinose, gentianose, stachyose, cellotriose, planteose, maltotriose, melezitose, lacto-N-tetraose and raffinose.

These solid humectants and/or the above-mentioned polyols may be either used alone as the impregnating agent, or impregnated as a mixture of two or more thereof. Further, they may be mixed with water and impregnated as an aqueous solution.

The capture member of the invention can be impregnated with a base, an antifoaming agent, a preservative or the like as the impregnating agent, as needed.

The bases used as the above-mentioned impregnating agent include, for example, alkanolamines, inorganic bases and imidazoles.

Specific examples of the alkanolamines include monoethanolamine, diethanolamine and triethanolamine, or monopropanolamine, dipropanolamine and tripropanolamine. For example, triethanolamine has a vapor pressure at 20° C. of 0.1 mmHg, so that it has both characteristics of the humectant and the base according to the invention Specific examples of the inorganic bases include lithium hydroxide, sodium hydroxide and potassium hydroxide.

Specific examples of the imidazoles include imidazole, N-methylimidazole, 2-methylimidazole, 2-hydroxyimidazole, 4-hydroxyimidazole and 5-hydroxyimidazole.

The antifoaming agents used as the above-mentioned impregnating agent include, for example, alcohols (for example, methanol), ethers (for example, ethylene glycol monophenyl ether), polyols (for example, an alkylene oxide compound), fatty acid esters (for example, isoamyl stearate), metal soaps (for example, aluminum stearate), phosphoric esters, silicones (for example, modified silicone oil) and nonionic surfactants (for example, an acetylene glycol-based surfactant).

Specific examples of the preservatives used as the above-mentioned impregnating agent include dichlorophen, hexachlorophen, 1,2-benzothiazoline-3-one, 3,4-iso-thiazoline-3-one, 4,4-dimethyloxazolidine, an alkyliso-thiazolone, a chloroalkylisothiazolone, benzisothiazolone, bron0nitroalcohol and chloroxylenol.

The polyols, humectants, bases, antifoaming agents and preservatives described above may be used either alone or as a mixed solution thereof. The mixing ratio thereof may be appropriately determined depending on the impregnation workability to the capture member, the kind of pigment ink used, and the like. It is not particularly limited as long as the intended effect is secured.

The sintered porous plastic constituting the capture member of the invention can allow the ink droplets which have landed and deposited on the surface thereof not only to rapidly penetrate in the inside direction (gravitational direction), but also to diffuse in the widthwise direction (horizontal direction) of the surface of the capture member. Accordingly, in a printer comprising a printer head for color printing having such a structure that another ink droplet does not land on the ink droplet which has landed on the surface of the capture member, the capture member of the invention can be suitably used.

That is to say, when a certain ink droplet lands on the surface of the capture member, ink droplet components penetrate in the inside of the capture member. However, all the components do not penetrate in the inside of the capture member, and they partially remain on the surface thereof in some cases. The residual components come into contact with air, so that they are solidified by drying to accumulate as a pigment agglomerate protruding on the surface. In this case, when another droplet lands on the above-mentioned residual components, the ink components remaining on the surface can be allowed to penetrate in the inside. However, when the printer head for color printing having such a structure that another ink droplet does not land on the ink droplet which has landed on the surface of the capture member is used, and moreover, when the capture member poor in diffusibility in the horizontal direction is used, there is no opportunity to allow the ink components remaining on the surface of the capture member to penetrate in the inside thereof. Accordingly, the solidification by drying of the residual components tends to proceed. In contrast, the sintered porous plastic constituting the capture member of the invention has the action of diffusing the ink components in the horizontal direction, as described above, so that the solidification by drying of the residual components on the surface of the capture member can be effectively reduced even in the printer comprising the printer head for color printing having such a structure that another ink droplet does not land on the ink droplet which has landed on the surface of the capture member, as described above.

In marginless printing by an ink jet recording system, the capture member of the invention is useful as a capture member for capturing ink droplets ejected to an area other than a recording medium, and particularly useful as a capture member for a pigment ink printer. Further, the capture member of the invention can be suitably used in a printer comprising a printer head for color printing having such a structure that another ink droplet does not land on an ink droplet which has landed on a surface of the capture member.

While the present invention has been described in detail and with reference to specific embodiments thereof, it will be apparent to one skilled in the art that various changes and modifications can be made therein without departing from the spirit and scope thereof.

This application is based on Japanese Patent Application No. 2005-242233 filed Aug. 24, 2005, and the contents thereof is herein incorporated by reference.

What is claimed is:

1. A method for marginless printing, comprising:

a) providing an ink jet printer comprising a recording head mounted on a carriage which reciprocates along a guide shaft extending in a main scanning direction, a platen disposed under the recording head, paper feed means for feeding paper in a sub-scanning direction between the recording head and the platen, and a capture member mounted on the platen for capturing ink droplets ejected from the recording head which land outside an edge of paper fed by the paper feed means, wherein the capture member comprises (a) a porous plastic produced by sinter molding of plastic particles such that the ink droplets deposited from the recording head onto the surface of the capture member, in addition to penetrating into the capture member in a gravitational direction, also diffuse in a horizontal direction, and (b) an impregnating agent impregnated in the capture member, the impregnating agent comprising at least a solid humectant having a melting point of 20° C. or more and a solubility in water at 20° C. of 5% by weight or more;

b) feeding paper into the ink jet printer in the sub-scanning direction; and c) ejecting ink droplets from the recording head such that a first plurality of the ejected ink droplets form print on the paper, including an edge thereof, and a second plurality of the ejected ink droplets land on the capture member.

2. The method according to claim 1, wherein the solid humectant is selected from the group consisting of alcohols, esters, nitrogen compounds and saccharides.

3. The method according to claim 2, wherein the solid humectant is an alcohol.

4. The method according to claim 3, wherein the alcohol is selected from the group consisting of 1,4-butanediol, 2,3-butanediol and 2-ethyl-2-(hydroxymethyl)-1,3-propanediol.

5. The method according to claim 2, wherein the solid humectant is an ester.

6. The method according to claim 5, wherein the ester is ethylene carbonate.

7. The method according to claim 2, wherein the solid humectant is a nitrogen compound.

8. The method according to claim 7, wherein the nitrogen compound is selected from the group consisting of acetamide, N-methylacetamide, 2-pyrrolidone, ϵ-caprolactam, urea, thiourea and N-ethylurea.

9. The method according to claim 2, wherein the solid humectant is a saccharide.

10. The method according to claim 9, wherein the saccharide is selected from the group consisting of dihydroxyacetone, erythritol, D-arabinose, L-arabinose, D-xylose, 2-deoxy-β-D-ribose, D-lyxose, L-lyxose, D-ribose, D-arabitol, ribitol, D-altrose, D-allose, D-galactose, L-galactose, D-quinovose, D-glucose, D-digitalose, D-digitoxose, D-cymarose, L-sorbose, D-tagatose, D-talose, 2-deoxy-D-glucose, D-fucose, L-fucose, D-fructose, D-mannose, L-rhamnose, D-inositol, myo-inositol, D-glucitol, D-mannitol, methyl-D-galactopyranoside, methyl-D-glucopyranoside, methyl-D-mannopyranoside, N-acetylchitobiose, isomaltose, xylobiose, gentiobiose, kojibiose, chondrosine, sucrose, cellobiose, sophorose, α,α-trehalose, maltose, melibiose, lactose, laminaribiose, rutinose, gentianose, stachyose, cellotriose, planteose, maltotriose, melezitose, lacto-N-tetraose and raffinose.

* * * * *